United States Patent
Park

(10) Patent No.: US 8,806,376 B2
(45) Date of Patent: Aug. 12, 2014

(54) MOBILE COMMUNICATION DEVICE AND METHOD OF CONTROLLING THE SAME

(75) Inventor: Jung Young Park, Seoul (KR)

(73) Assignee: LG Electronics Inc., Seoul (KR)

( * ) Notice: Subject to any disclaimer, the term of this patent is extended or adjusted under 35 U.S.C. 154(b) by 992 days.

(21) Appl. No.: 12/102,824

(22) Filed: Apr. 14, 2008

(65) Prior Publication Data

US 2008/0282196 A1 Nov. 13, 2008

(30) Foreign Application Priority Data

May 9, 2007 (KR) ........................ 10-2007-0045068

(51) Int. Cl.
*G06F 3/00* (2006.01)
*H04M 1/725* (2006.01)

(52) U.S. Cl.
CPC ...... *H04M 1/72561* (2013.01); *H04M 1/72544* (2013.01)
USPC ............ 715/838; 715/705; 715/825; 715/835

(58) Field of Classification Search
USPC .................. 715/705, 825, 835, 838
See application file for complete search history.

(56) References Cited

U.S. PATENT DOCUMENTS

| | | | | |
|---|---|---|---|---|
| 6,356,908 B1 * | 3/2002 | Brown et al. | | 1/1 |
| 6,590,586 B1 * | 7/2003 | Swenton-Wall et al. | | 715/730 |
| 6,597,377 B1 * | 7/2003 | MacPhail | | 715/738 |
| 6,667,751 B1 * | 12/2003 | Wynn et al. | | 715/833 |
| 6,693,652 B1 * | 2/2004 | Barrus et al. | | 715/838 |
| 7,013,130 B2 * | 3/2006 | Ku | | 455/414.2 |
| 7,479,949 B2 * | 1/2009 | Jobs et al. | | 345/173 |
| 7,689,932 B2 * | 3/2010 | Maktedar | | 715/825 |
| 7,716,605 B2 * | 5/2010 | Oh | | 715/838 |
| 7,827,075 B2 * | 11/2010 | Hess et al. | | 715/748 |
| 2003/0079179 A1 * | 4/2003 | Brown et al. | | 715/501.1 |
| 2004/0049541 A1 * | 3/2004 | Swahn | | 709/203 |
| 2005/0216526 A1 * | 9/2005 | Kumagai | | 707/201 |
| 2006/0224624 A1 * | 10/2006 | Korn et al. | | 707/104.1 |
| 2006/0277167 A1 * | 12/2006 | Gross et al. | | 707/3 |
| 2007/0085759 A1 * | 4/2007 | Lee et al. | | 345/1.1 |
| 2007/0136679 A1 * | 6/2007 | Yang | | 715/772 |

(Continued)

FOREIGN PATENT DOCUMENTS

| | | |
|---|---|---|
| EP | 1100025 | 5/2001 |
| JP | 2002-325286 | 8/2002 |
| KR | 1020000037283 | 7/2000 |
| KR | 1020020082509 | 10/2002 |

OTHER PUBLICATIONS

Linda Cole, "The Dastardly favicon.ico not found; Error", http://www.wdvl.com/Authoring/Design/Images/Favicon/icon.html, Aug. 3, 1999.

(Continued)

*Primary Examiner* — Amy Ng
*Assistant Examiner* — Meseker Takele
(74) *Attorney, Agent, or Firm* — Lee, Hong, Degerman, Kang & Waimey

(57) ABSTRACT

Disclosed are a mobile communication device and a method of controlling the same in which an image of a web page is stored as a thumbnail image when the web page is added to a list of favorites. When the list of favorites is requested from the mobile communication device, a plurality of thumbnail images corresponding to a plurality of web pages added to the list of favorites are displayed.

26 Claims, 13 Drawing Sheets (a)　　　(b)

(56) References Cited

U.S. PATENT DOCUMENTS

| | | | |
|---|---|---|---|
| 2009/0106698 A1* | 4/2009 | Hansen et al. | 715/838 |
| 2009/0241058 A1* | 9/2009 | Costello et al. | 715/784 |
| 2009/0300511 A1* | 12/2009 | Behar et al. | 715/745 |
| 2010/0185989 A1* | 7/2010 | Shiplacoff et al. | 715/856 |
| 2011/0145688 A1* | 6/2011 | Han et al. | 715/206 |

OTHER PUBLICATIONS

PC Magazine, "PC Magazine's Favorg v1.0", http://www.zdnet.com/downloads/stories/info/0,,001BXO,.html, Oct. 4, 2000.

Wikipedia "Favicon", http://web.archive.org/web/20040617091708/http://en.wikipedia.org/wiki/Favicon, May 13, 2004.

* cited by examiner

MOBILE COMMUNICATION DEVICE AND METHOD OF CONTROLLING THE SAME

CROSS-REFERENCE TO RELATED APPLICATIONS

Pursuant to 35 U.S.C. §119(a), this application claims the benefit of earlier filing date and right of priority to Korean Application No. 10-2007-0045068, filed on May 9, 2007, the contents of which are hereby incorporated by reference herein in their entirety.

FIELD OF THE INVENTION

The present invention is directed to a mobile communication device and a method of controlling the same in which a plurality of thumbnail images corresponding to a plurality of web pages in a list of favorites are displayed when the list of favorites is requested by a user.

DESCRIPTION OF THE RELATED ART

Generally, mobile communication devices store information regarding previously accessed web pages to facilitate easier access of the same web pages in the future by using the stored information. Specifically, the information regarding web pages may be saved in a list of favorites as in a common web browser of a personal computer. Examples of the information regarding web pages include uniform resource locator (URL) addresses and names of the web pages. If the information regarding web pages is requested by a user, the URL addresses and the names of the web pages may be displayed to facilitate the user's easy access to and recognition of desired web pages.

However, when web pages with long URL addresses or names are added to the list of favorites, the entire length of the URL addresses or the names of the web pages may not be displayed in full length on a screen due to a limited display area on the mobile communication devices. In order to solve this problem, a scroll bar may be provided to the display area such that the URL addresses or the names of web pages in the list of favorites may be scrolled to the left or to the right. Alternatively, the web pages may be added to the list of favorites with user-given names, rather than the original names shown on the web pages. However, it may still be difficult to readily recognize each web page by the user-given names to access a web page of interest.

SUMMARY OF THE INVENTION

According to an embodiment of the present invention, there is provided a method of operating a mobile communication device, the method including recognizing a plurality of predetermined websites; generating at least one thumbnail image of the plurality of predetermined websites, each thumbnail image generated using at least a part of a content from a corresponding website; storing the at least one generated thumbnail image; displaying a plurality of thumbnail images on a display screen, each thumbnail image corresponding to each respective one of the plurality of websites; recognizing a selection of one of the plurality of thumbnail images; and displaying on the display screen a website associated with the selected thumbnail image.

Preferably, the plurality of thumbnail images is arranged in a specific order on the display screen and the specific order may be set according to at least one of a user's preference, a thumbnail image stored date, a website access date, and an alphabetic order. In the method, a size of the displayed website is larger than a size of the thumbnail image.

In one aspect of the invention, the step of displaying a website associated with the selected thumbnail image also includes displaying an enlarged thumbnail image of the selected thumbnail image before displaying the website associated with the selected thumbnail image and selecting the enlarged thumbnail image to display the website. Preferably, the website associated with the selected thumbnail image is displayed on an entire area of the display screen. More preferably, the website is displayed on the display screen without a toolbar.

The enlarged thumbnail image is at least partially displayed overlaying the plurality of thumbnail images on the display screen while the plurality of thumbnail images is at least partially displayed as a background of the enlarged thumbnail image.

In another aspect of the invention, the step of displaying the website associated with the selected thumbnail image also includes selecting a different thumbnail image from the plurality of thumbnail images overlaid by the enlarged thumbnail image to display a new enlarged thumbnail image corresponding to the selected different thumbnail image before displaying a website associated with the selected different thumbnail image.

In yet another aspect of the invention, the plurality of thumbnail images is added to a list of favorites. In one embodiment, the thumbnail image is selected by using a cursor on the display screen. In another embodiment, the thumbnail image is selected by recognizing sensory touching of one of the plurality of thumbnail images. In yet another embodiment, the website is displayed with a name of the website on the display screen.

In a further aspect of the invention, the at least one stored thumbnail image is updated according to an updated image of the corresponding website. In one embodiment, the at least one stored thumbnail image is updated in response to a user instruction. In another embodiment, the at least one stored thumbnail image is updated at a predetermined time.

According to another embodiment of the present invention, there is provided a mobile communication device including a wireless communication unit for providing an interface for web access; a display unit for displaying a web page received through the wireless communication unit; a control unit for recognizing a plurality of predetermined websites and generating on the display unit at least one thumbnail image of the plurality of predetermined websites, each thumbnail image generated using at least a part of a content from a corresponding website, the control unit further configured to display a plurality of thumbnail images on the display unit, each thumbnail image corresponding to respective one of the plurality of predetermined websites; and input unit for recognizing a selection of one of the plurality of thumbnail images such that a website associated with the selected thumbnail image is displayed on the display unit.

In one aspect of the invention, the input unit includes at least one of a keypad and a touch screen. The mobile communication device further includes a memory for storing data and providing the data in response to a request from the control unit, wherein the data includes at least one of the thumbnail image, web page information, and a list of favorites.

BRIEF DESCRIPTION OF THE DRAWINGS

The above and other features and advantages of the present invention will become more apparent by describing in detail preferred embodiments thereof with reference to the attached drawings.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1:
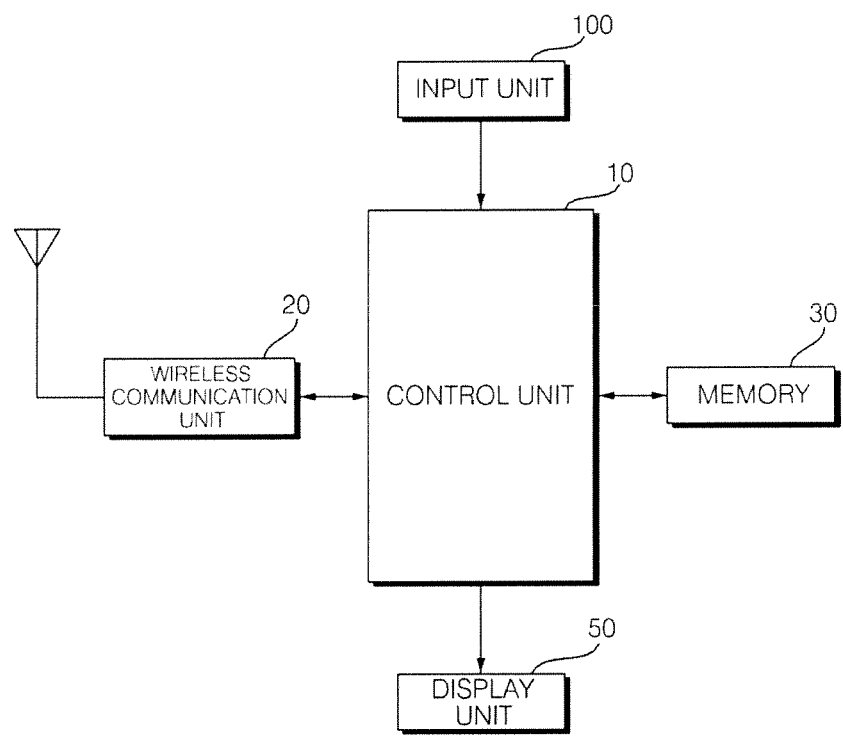
FIG. 1 is a block diagram of a mobile communication device according to an embodiment of the present invention.

Referring to FIG. 1, the mobile communication device 100 according to an embodiment of the present invention includes an input unit 40 to which a user command is applied through key manipulation, a display unit 50 which displays data, a memory 30 which stores data, a wireless communication unit 20 which transmits/receives data, and a control unit 10 which controls the operations of the input unit 40, the display unit 50, and the wireless communication unit 20.

A control signal generated by manipulation of a plurality of key buttons in the input unit 40 is transmitted to the control unit 10. In addition to a keypad which is provided on a main body of the mobile communication device 100, the key buttons of the input unit 40 may be provided on lateral sides of the main body. The input unit 40 may also be provided as a touch screen on the display unit 50. The display unit 50 may include a liquid crystal display (LCD) screen. The display unit 50 displays data according to the operation of the mobile communication device 100.

The wireless communication unit 20 provides an interface for communication with a base station through an antenna. The wireless communication unit 20 also provides an interface for web access. The memory 30 stores data of the mobile communication device 100 and setting data for the operation of the mobile communication device 100. The memory 30 also stores a list of favorites, including web page information provided by websites accessed by the mobile communication device 100 via the wireless communication unit 20, and images of web pages stored in the list of favorites. Moreover, the memory 30 may store the images of the web pages stored in the list of favorites as thumbnail images. The memory 30 also provides the data stored therein upon a request from the control unit 10.

The control unit 10 controls the operation of the mobile communication device 100 by controlling the operations of the input unit 40, the display unit 50 and the wireless communication unit 20. Specifically, when the mobile communication device 100 accesses the Internet through the wireless communication unit 20, the control unit 10 may control a web page accessed by the mobile communication unit 100 to display the web page on the display unit 50. In this case, if a command to add the accessed web page to a list of favorites is applied to the mobile communication device 100 through the wireless communication unit 20, the control unit 10 will store an image of the accessed web page in the memory 30 as a thumbnail image along with web page information regarding the accessed web page, such as a uniform resource locator (URL) address of the accessed web page. In addition, when the list of favorites is accessed, the control unit 10 controls and displays a plurality of thumbnail images corresponding to a plurality of web pages in the list of favorites on a screen of the display unit 50.

Figure 2:
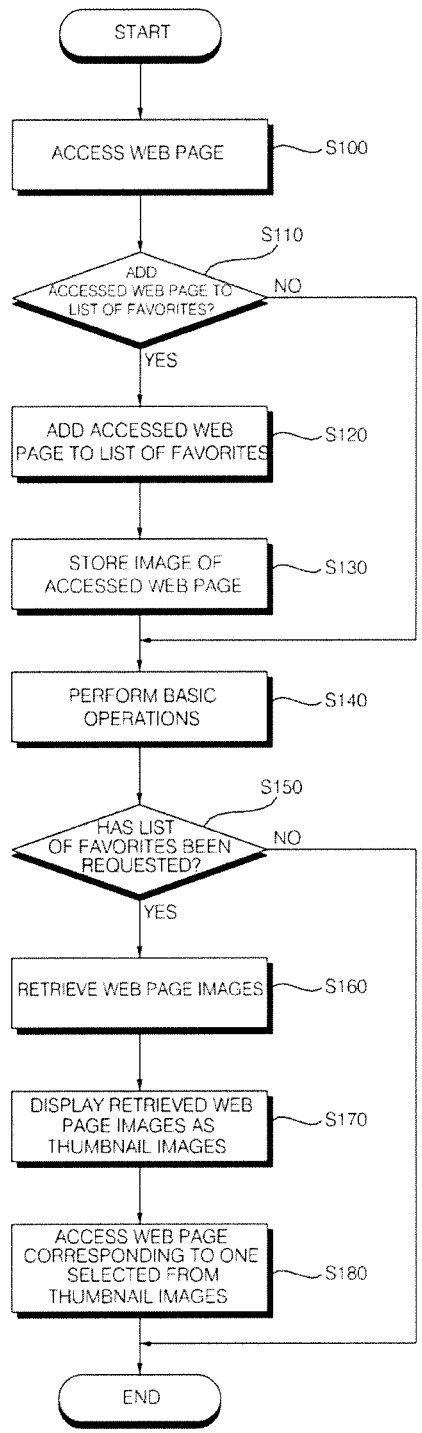
FIG. 2 shows a flowchart illustrating a method of controlling a mobile communication device to add an accessed web page to a list of favorites, and display and access the web page added to the list of favorites according to an embodiment of the present invention.

FIG. 2 shows a flowchart illustrating a method of controlling a mobile communication terminal according to an embodiment of the present invention. Referring to FIG. 2, the control unit 10 controls a web page to be accessed in response to a command input by a user and also controls the accessed web page to be displayed on the screen of the display unit 50 (S100). If the user wishes to add the accessed web page to a list of favorites (S110 YES), the control unit 10 stores information regarding the accessed web page in the list of favorites (S120). Then, the control unit 10 controls an image of the accessed web page to be stored as a thumbnail image (S130). Alternatively, the user may not wish to add the accessed web page to the list of favorites (S110 NO).

Thereafter, the control unit 10 performs its basic operations in response to a command input by the user (S140). If a command to access the list of favorites is applied (S150), the control unit 10 retrieves a plurality of thumbnail images corresponding to a plurality of web pages stored in the list of favorites (S160), and controls the list of favorites to be displayed as thumbnail images (S170). When one of the displayed thumbnail images is selected by the user, the control unit 10 controls a web page corresponding to the selected thumbnail image, and also controls an image of the web page corresponding to the selected thumbnail image and to be displayed on the screen of the display unit 50 (S180).

Figure 3:
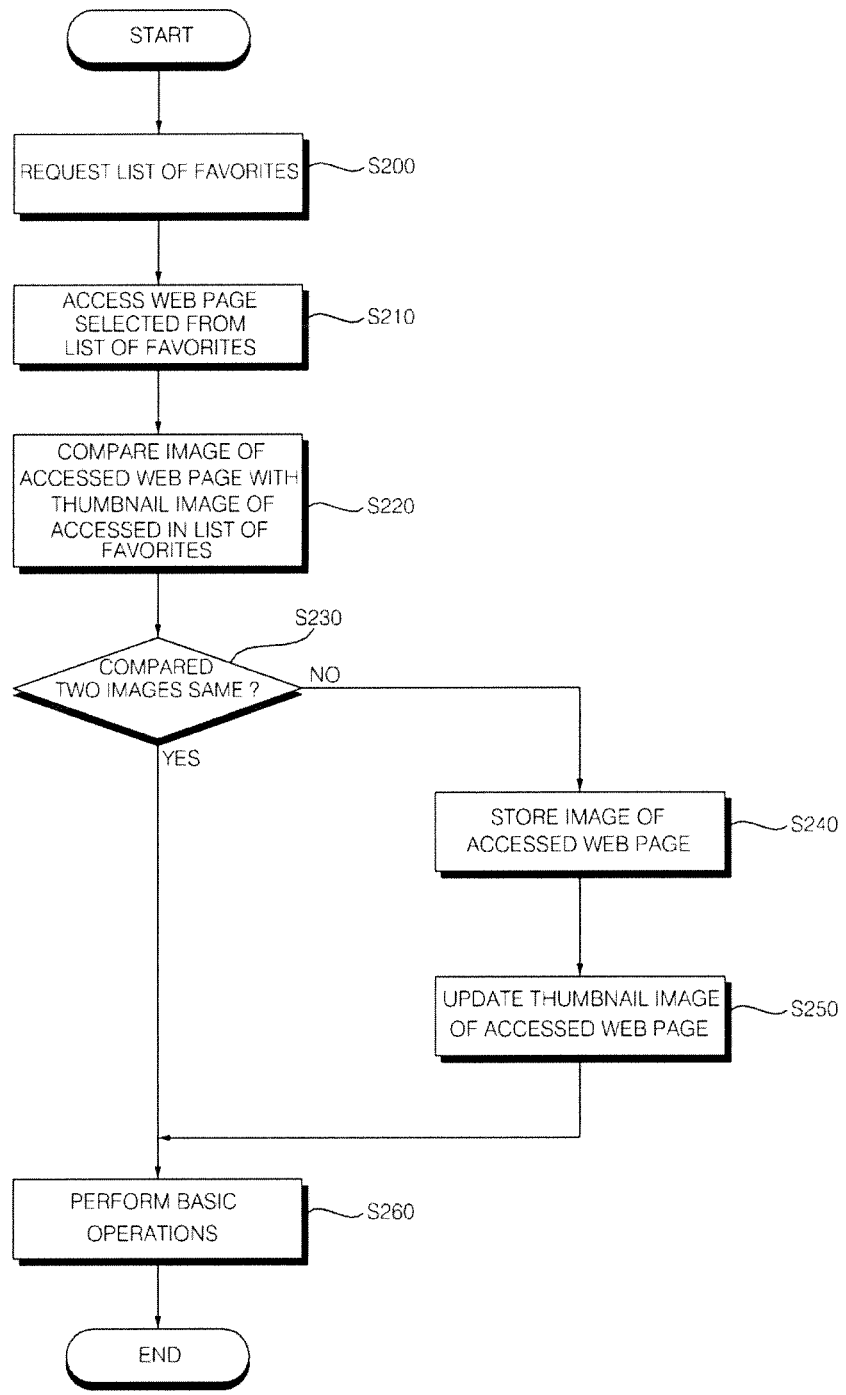
FIGS. 3 and 4 show flowcharts illustrating updating thumbnail images of web pages added to a list of favorites according to an embodiment of the present invention.

FIG. 3 shows a flowchart illustrating updating a thumbnail image of a web page stored in a list of favorites. Referring to FIG. 3, if a command to access at least one web page stored in a list of favorites is applied (S200), the control unit 10 retrieves the list of favorites and controls the list of favorites to be displayed by the display unit 50. Preferably, the control unit 10 controls a plurality of thumbnail images corresponding to a plurality of web pages stored in the list of favorites.

If one of the displayed thumbnail images is selected, the control unit 10 retrieves web page information corresponding to the selected thumbnail image, controls a web page corresponding to the web page information, and also controls the web page information to be displayed by the display unit 50 (S210). The control unit 10 compares the current image of the accessed web page with the selected thumbnail image of the accessed web page as stored in the list of favorites (S220). If the current image of the accessed web page is the same as the selected thumbnail image (S230 YES), the control unit 10 performs the basic operations in response to a control command input by the user (S260). On the other hand, if the current image of the accessed web page is not same as the selected thumbnail image (S230 NO), the control unit 10 stores in memory the current image of the accessed web page as a new thumbnail image for the accessed web page (S240)

to update and replace the existing thumbnail image of the web page in the list of favorites with a newer image of the currently accessed web page (S250).

Figure 4:
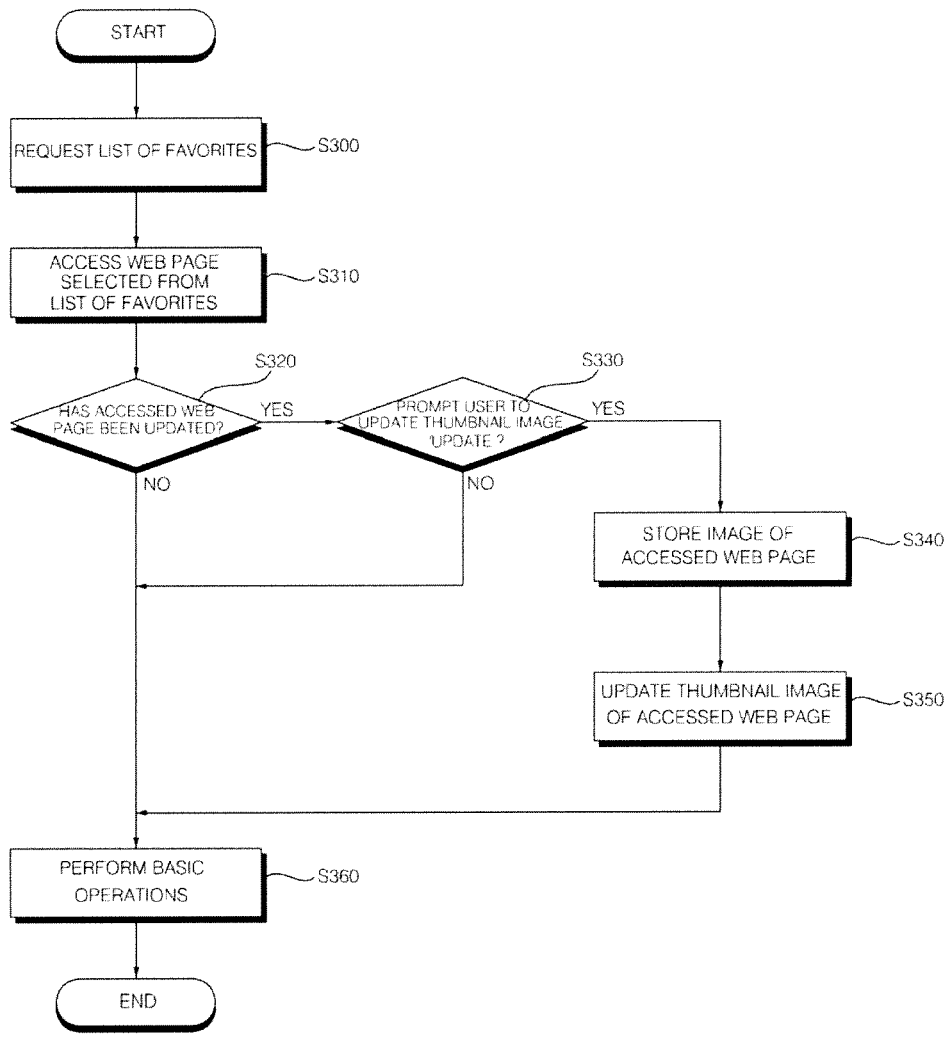

FIG. 4 illustrates updating a thumbnail image stored in the mobile communication device 100 in response to a user command. Referring to FIG. 4, if a command to access at least one web page stored in a list of favorites is applied (S300), the control unit 10 retrieves the list of favorites and controls the list of favorites to be displayed by the display unit 50. Specifically, the control unit 10 controls a plurality of thumbnail images corresponding to a plurality of web pages stored in the list of favorites.

If one of the displayed thumbnail images is selected, the control unit 10 retrieves web page information corresponding to the selected thumbnail image, controls a web page corresponding to the web page information and also controls the web page information to be displayed by the display unit 50 (S310). The control unit 10 then determines whether the currently accessed web page has been updated (S320). Thereafter, if the currently accessed web page has not been updated (S320 NO), the control unit 10 performs its basic operations in response to a control command (S360). On the other hand, if the accessed web page has been updated, the control unit 10 prompts a user to update the thumbnail image stored in the list of favorites (S330). If the user does not want to update the thumbnail image (S330 NO), the control unit 10 performs its basic operations in response to a control command (S360) without updating the thumbnail image. In contrast, if the user wants to update the thumbnail image, in response to a command input by the user (S330 YES), the control unit 10 stores an image of the updated web page as a new thumbnail image of the updated web page (S340) to update the existing thumbnail image of the web page with the current image of the updated web page (S350).

Alternatively, the mobile communication device 100 may be set by the user such that the control unit 10 automatically stores the image of the updated web page as a new thumbnail image of the updated web page (S340) and updates the existing thumbnail image of the web page with the current image of the updated web page (S350) without prompting the user to update and replace the existing thumbnail image when the accessed web page has been updated (omitting S330).

Figure 5:
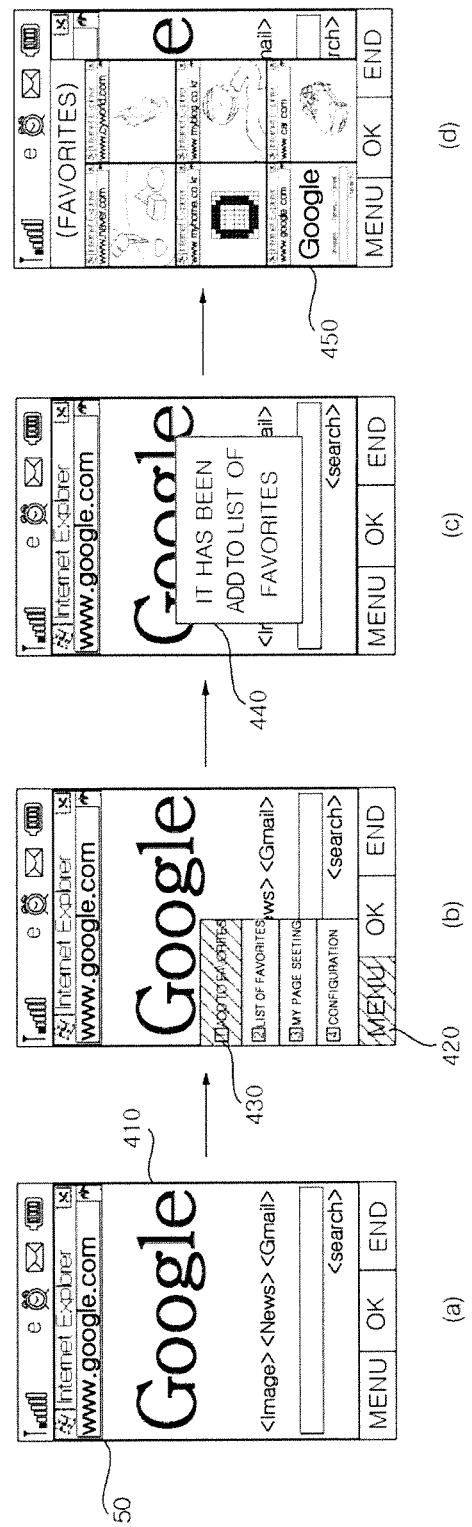
FIGS. 5 through 9 show screen images from a mobile communication device according to an embodiment of the present invention and illustrate processes of adding accessed web pages to a list of favorites and accessing the web pages in the list.

FIGS. 5 through 9 illustrate screen images in connection with the method illustrated in FIG. 2. Specifically, FIG. 5 illustrates screen images generated during a process of storing an accessed web page to a list of favorites. Referring to FIG. 5(a), when a website is accessed, the control unit 10 controls a web page 410 of the website to be displayed on the screen of the display unit 50.

Referring to FIGS. 5(b) and 5(c), if a first menu item 'ADD TO FAVORITES' is selected through manipulation of a button 'MENU' 420, the web page 410 is added to a list of favorites and a message 440 indicating the addition of the web page 410 to the list of favorites is displayed on the screen of the display unit 50 according to predefined settings.

Referring to FIG. 5(d), the control unit 10 may also store an image of the web page 410 added to the list of favorites as a thumbnail image 450 to display at least one thumbnail image when the list of favorites is requested.

Figure 6:
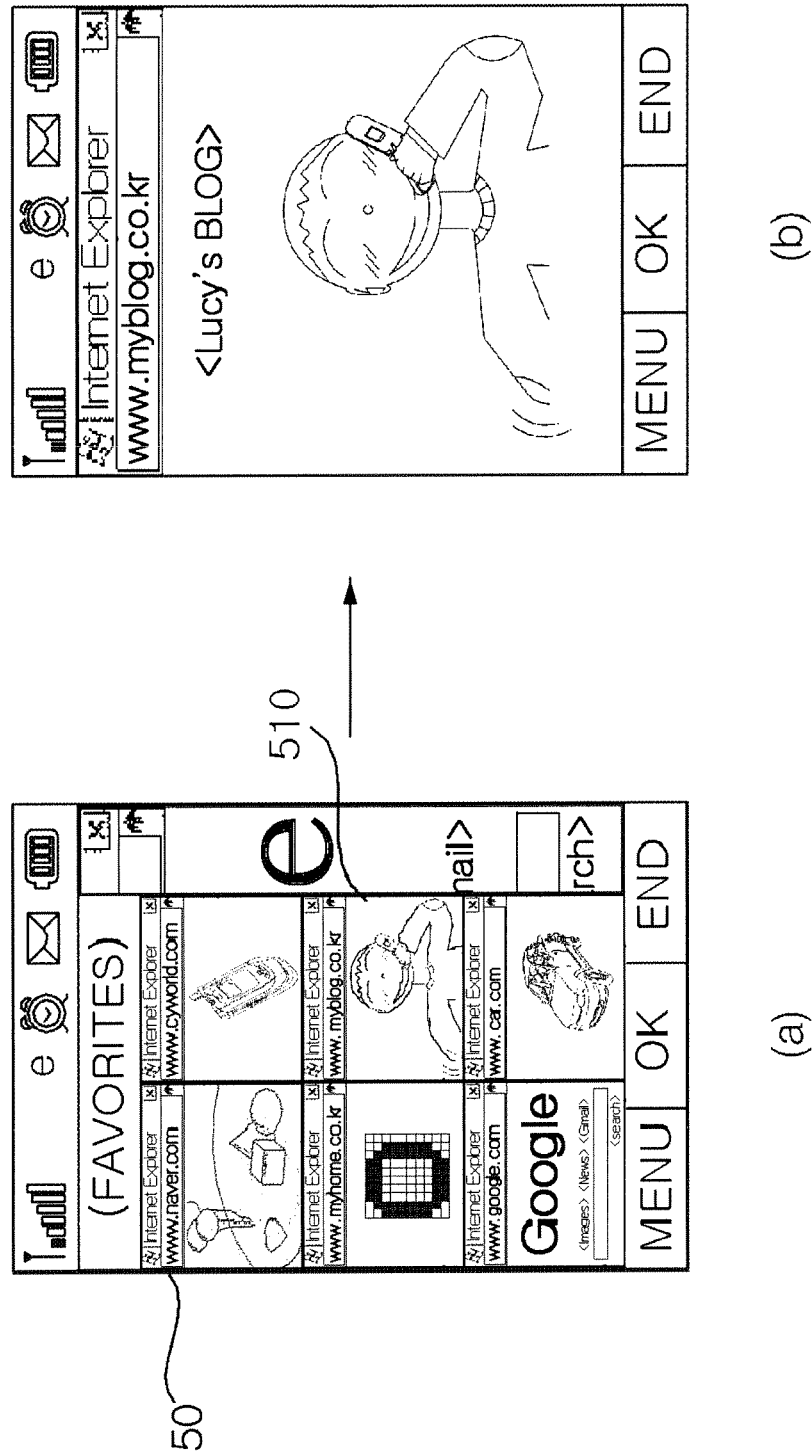

FIG. 6 shows screen images illustrating an access to a web page through a thumbnail image displayed from a list of favorites. Referring to FIG. 6(a), when a list of favorites is requested, the control unit 10 retrieves a plurality of thumbnail images corresponding to a plurality of web pages stored in the list of favorites and displays the retrieved thumbnail images on the screen of the display unit 50.

Referring to FIG. 6(b), if one of the displayed thumbnail images, for example, a thumbnail image 510, is selected, the control unit 10 controls a web page corresponding to the thumbnail image 510 to be accessed.

Figure 7:
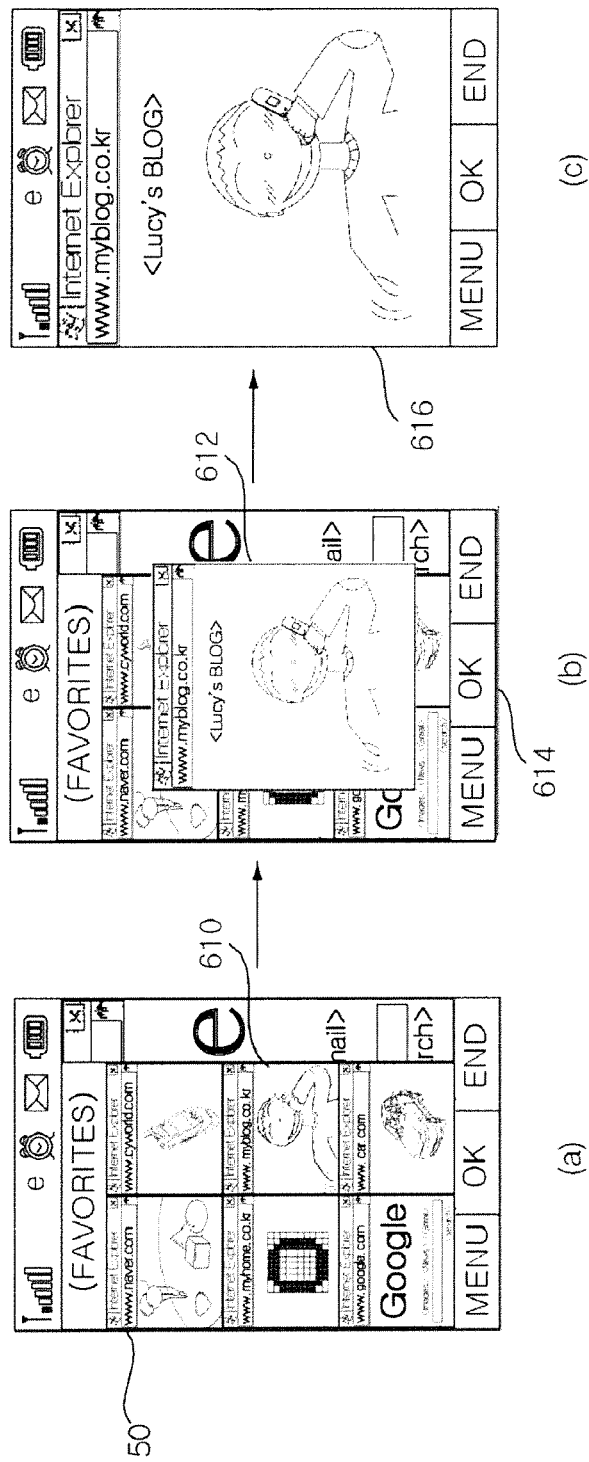
Figure 8:
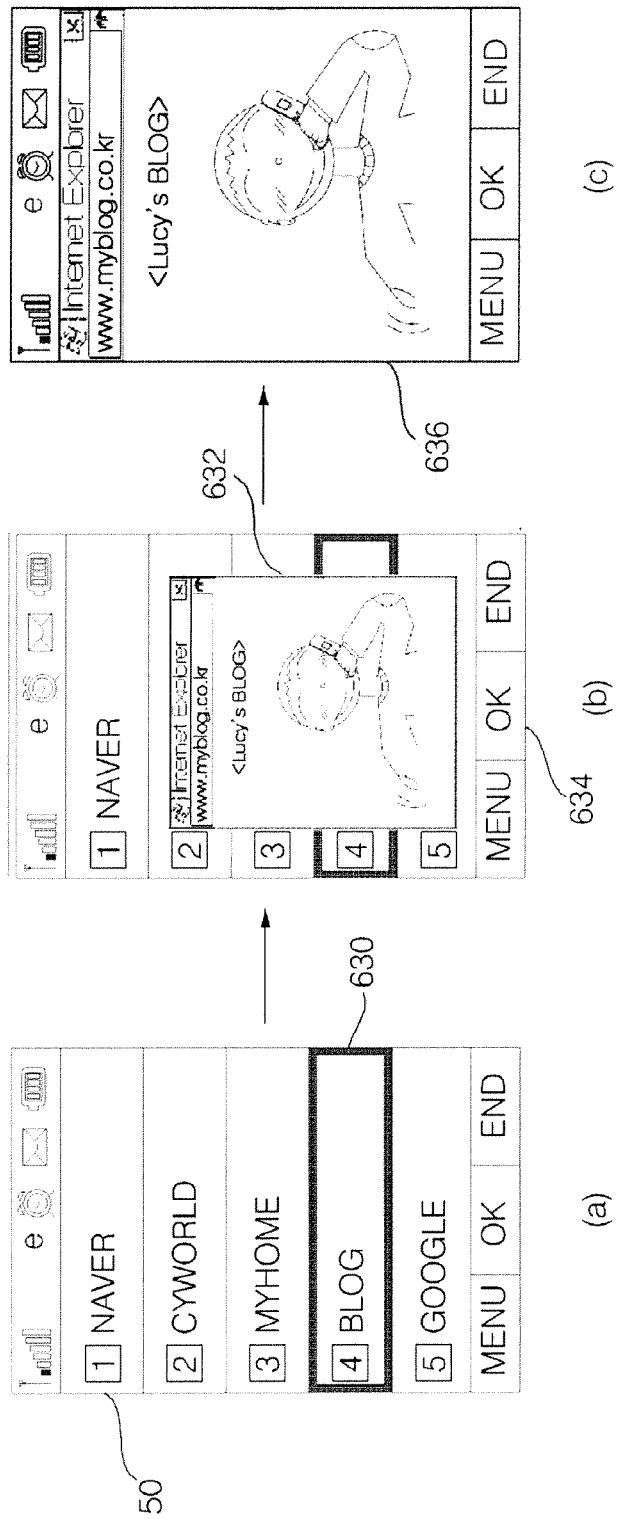

FIGS. 7 through 9 show screen images illustrating the display of a thumbnail image stored in a list of favorites. Referring to FIG. 7(a), when a list of favorites is requested, the control unit 10 retrieves a plurality of thumbnail images corresponding to a plurality of web pages stored in the list of favorites and displays the retrieved thumbnail images on the screen of the display unit 50.

Referring to FIG. 7(b), if one of the displayed thumbnail images, for example, a thumbnail image 610, is selected by movement of a pointing cursor or tapping on the thumbnail image 610 on a touch screen of the mobile communication device 100, the control unit 10 displays an enlarged view 612 of the thumbnail image 610 on the screen of the display unit 50. The plurality of thumbnail images shown in FIG. 7(a) may be displayed behind the enlarged view 612 of the thumbnail image 610. In particular, unselected thumbnail images may be shown as a background of the enlarged view 612. The thumbnail images on the background may be displayed in faded colors. Moreover, the enlarged view 612 of the thumbnail image 610 may be highlighted. Furthermore, the enlarged view 612 may be displayed transparently such that all of the thumbnail images can be shown on the background.

Referring to FIG. 7(c), if a button 'OK' 614 is selected in FIG. 7(b), the control unit 10 controls a web page 616 corresponding to the thumbnail image 610 to be accessed and displayed in full size on the screen of the display unit 50.

Alternatively, as in FIG. 7(b), when the enlarged view 612 of the selected thumbnail image 610 is displayed, rather than selecting 'OK' 614 to accept the enlarged view 612 as described above, if the user wants to select a different thumbnail image, the user may select the different thumbnail image shown behind the enlarged view 612 of the previously selected thumbnail image 610 (not shown in FIG.) or go back to the previous screen displaying a plurality of thumbnail images in the list of favorites (FIG. 7(a)).

According to the embodiment of FIG. 8, a list of favorites may be displayed as a list of a plurality of web page information in a text format. The mobile communication device 100 may be set to display the list of favorites in a text or image format. Referring to FIGS. 8(a) and 8(b), if a fourth item 'BLOG' 630 is selected from the list of favorites by movement of a pointing cursor through key manipulation or tapping on the fourth item on a touch screen (FIG. 8(a)), the control unit 10 displays a thumbnail view 632 of a web page 636 corresponding to the fourth item 'BLOG' 630 on the screen of the display unit 50 (FIG. 8(b)). Thereafter, referring to FIGS. 8(b) and 8(c), if a button 'OK' 634 is selected (FIG. 8(b)), the control unit 10 controls the web page 626 to be accessed and displayed on the screen of the display unit 50 (FIG. 8(c)).

In the embodiment of FIG. 9, the control unit 10 stores a web page in a list of favorites along with lower page information regarding a lower or linked page of the web page and an image of the lower page. Thus, when one of a plurality of thumbnail images included in the list of favorites is selected, the selected thumbnail image is displayed along with the images of one or more lower pages of the web page corresponding to the selected thumbnail image in a slideshow format. The lower page of the web page may include at least one of a web page stored according to user settings, a web page that has been accessed at least once, and a web page that has been accessed more than a predefined number of times.

Figure 9A:
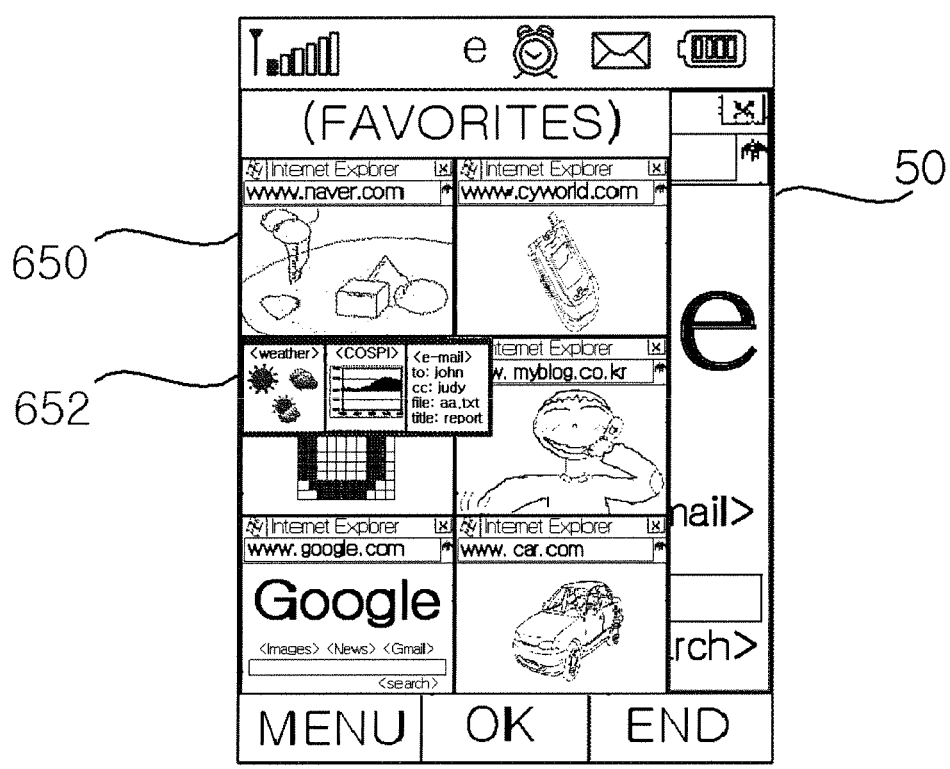

Specifically, referring to FIG. 9(a), the control unit 10 displays a selected thumbnail image in an area 650 and also displays one or more previously-stored lower pages of the web page corresponding to the selected thumbnail image in an area 652 of the display unit 50. For example, the thumbnail image in the area 650 may display the main page of the web page and the lower pages in the area 652 may display subcategory of the main page, such as news, finance, and weather pages.

Figure 9B:
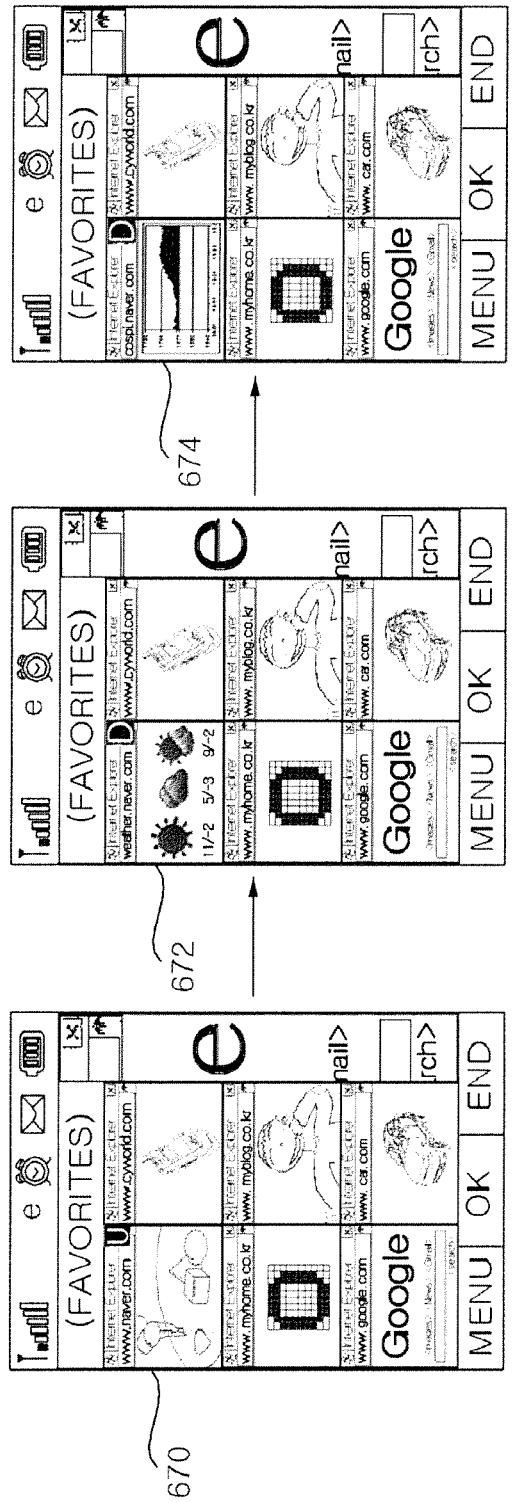

Referring to FIG. 9(b), the control unit 10 may sequentially display images 672 and 674 of the previously-stored lower pages of the web page corresponding to the selected thumbnail image in an area 670 as a slideshow. In order to differentiate the selected thumbnail image 670 from the previously-stored lower page images 672 and 674, an identifier such as text, an icon or an emoticon may be displayed in the selected thumbnail image and the previously-stored lower page images 672 and 674. For example, referring to FIG. 9(b), the letter 'U' may be displayed in the selected thumbnail image 670 as an abbreviation of the word 'up', and the letter 'D' may be displayed in the previously-stored lower page images 672 and 674 as an abbreviation of the word 'down'.

Alternatively, similar to FIG. 9(b), a 'forward' arrow may be displayed in an area of the initially selected thumbnail image and the previously-stored lower page images of the initially selected thumbnail image may be browsed by manually forwarding to the next image in the slideshow by selecting the 'forward' arrow. In addition to the 'forward' arrow, a 'back' arrow and a 'home' icon may also be displayed in an area of the previously-stored lower images and going back to the initially selected thumbnail image may be easily achieved from any slide image of the previously-stored lower pages by simply selecting the 'home' icon displayed in an area of the previously-stored lower page image. Other previously viewed slide image of the lower page may also be viewed again by selecting the 'back' arrow from the current image of the lower page (not shown in FIG.).

Figure 10:
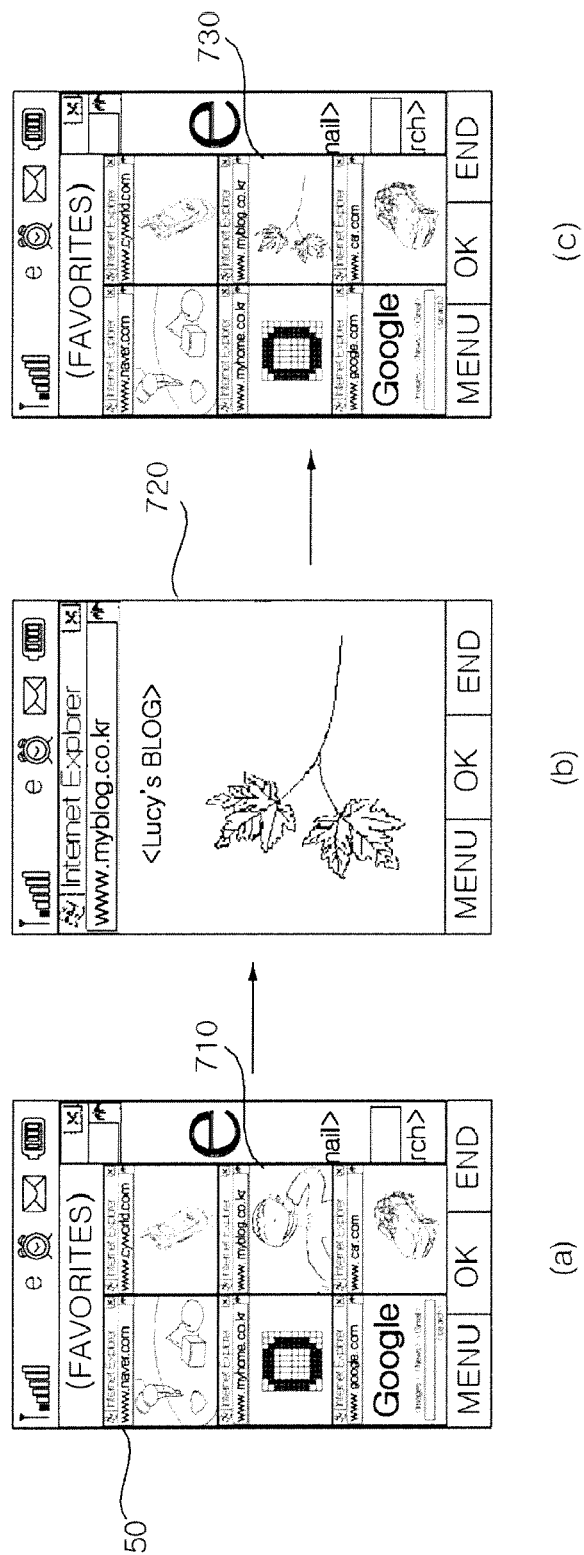
FIGS. 10 through 12 show screen images of a mobile communication device according to an embodiment of the present invention and illustrate processes of updating thumbnail images for web pages in a list of favorites.
Figure 11:
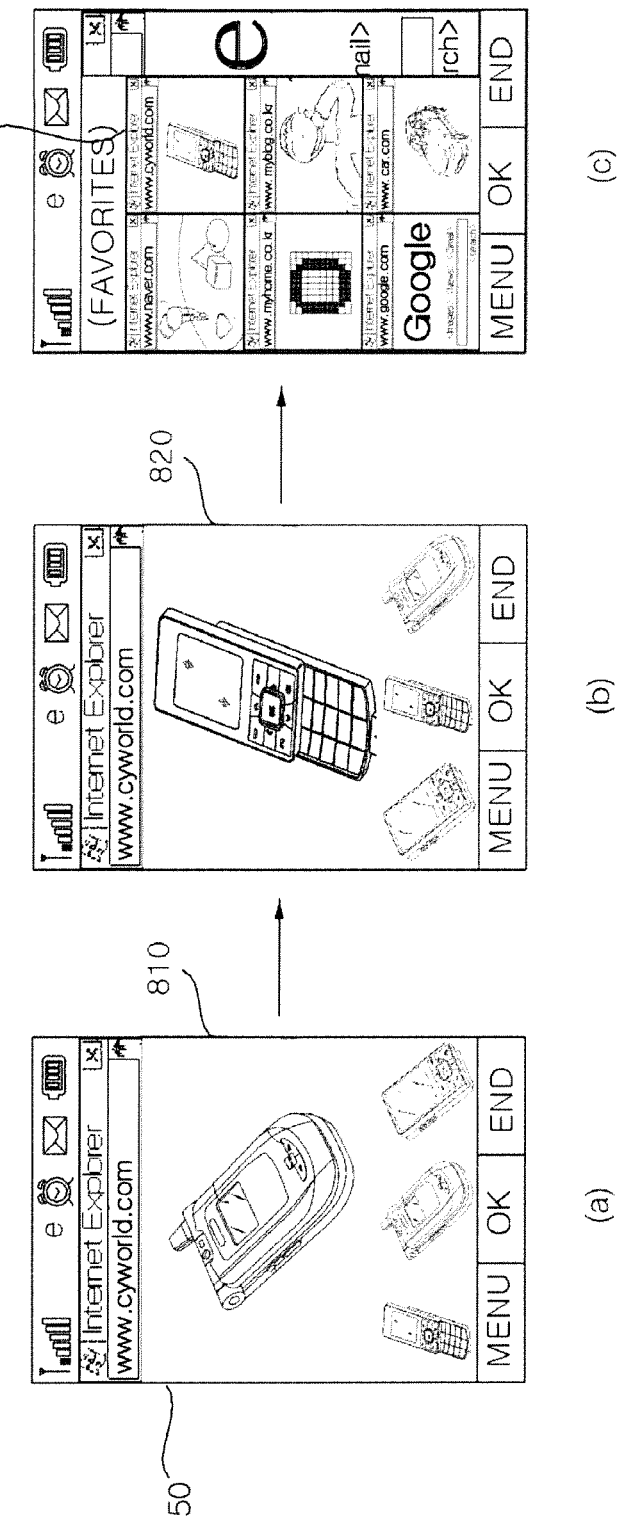
Figure 12:
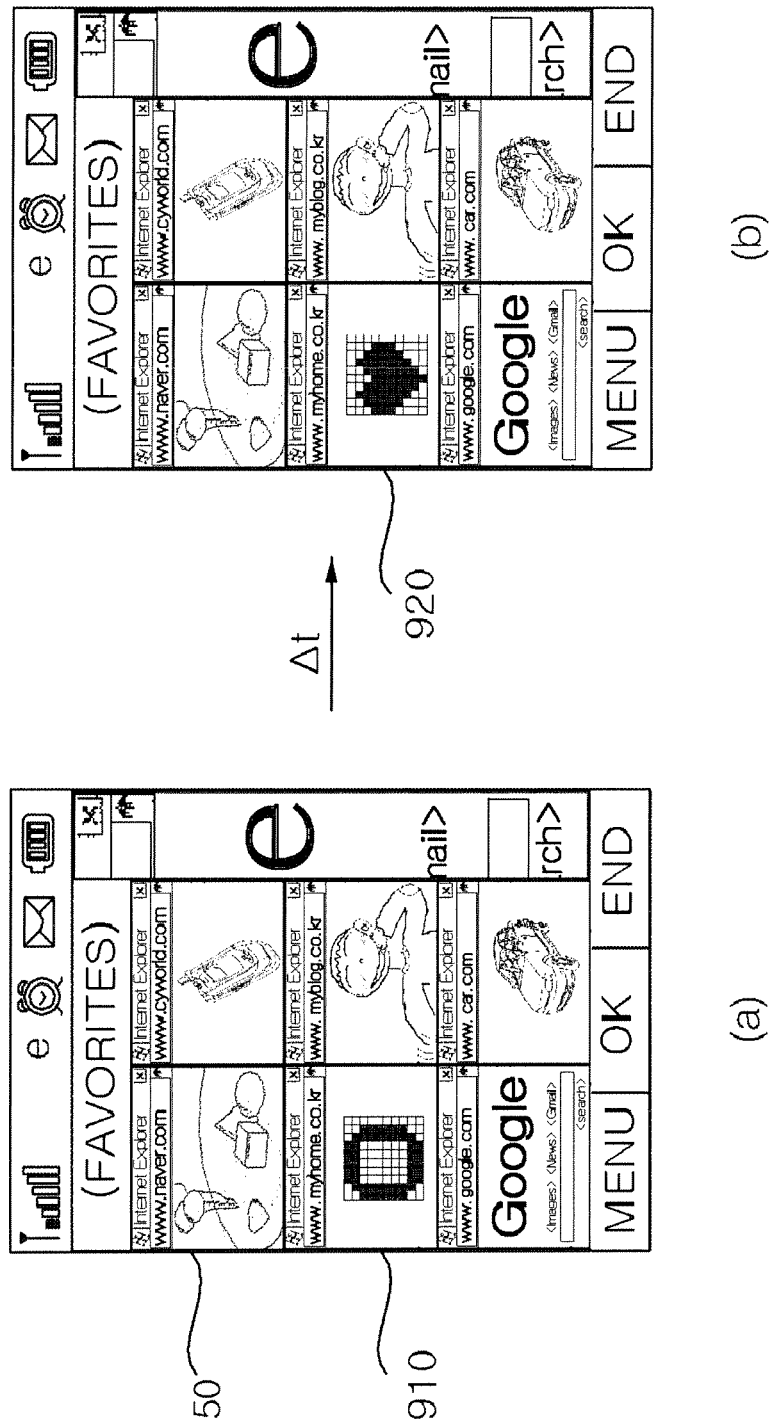

FIGS. 10 through 12 show screen images illustrating updating a thumbnail image stored in a list of favorites according to the method illustrated in FIG. 3. Referring to FIG. 10(a), when a list of favorites is requested (S200 in FIG. 3), the control unit 10 retrieves a plurality of thumbnail images corresponding to a plurality of web pages stored in the list of favorites and displays the retrieved thumbnail images on the screen of the display unit 50.

Referring to FIG. 10(b), if one of the displayed thumbnail images, for example, a thumbnail image 710, is selected, the control unit 10 retrieves web page information corresponding to the thumbnail image 710, and controls a web page 720 corresponding to the thumbnail image 710 to be accessed (S210 in FIG. 3). Then, the control unit 10 compares a current image of the accessed web page 720 with the thumbnail image 710 stored in the list of favorites (S220 in FIG. 3). If the current image of the accessed web page 720 is different from the existing thumbnail image 710 of the web page (S230 NO in FIG. 3), the control unit 10 stores the current new image of the web page 720 in the memory 30 (S240 in FIG. 3) and updates the existing thumbnail image 710 with the new image of the web page 720 resulting in an updated thumbnail image 730 as shown in FIG. 10(c).

Alternatively, before updating the thumbnail image as described above, after step (b) in FIG. 10, the control unit 10 may prompt a user whether to update the current thumbnail image 710 with the new image of the web page 720 (not shown in FIG.). If the user selects not to update the thumbnail image, the current thumbnail image 710 shown in FIG. 10(a) will be kept. However, if the user selects to update the thumbnail image (not shown in FIG.), an updated image of the web page 720 will be displayed as an updated thumbnail image 730 as shown in FIG. 10(c).

Referring to FIG. 11(a), the control unit 10 controls a web page 810 corresponding to a selected thumbnail image included in a list of favorites and to be displayed on the screen of the display unit 50. Referring to FIG. 11(b), if the web page 810, accessed in response to a control command input by a user, has been updated, the control unit 10 recognizes the update and automatically stores an updated web page 820 to update a thumbnail image corresponding to the web page 810 and stored in the list of favorites with an image of the updated web page 820. As a result, referring to FIG. 11(c), the image of the updated web page 820 is displayed as an updated thumbnail image 830 when the list of favorites is requested.

According to the embodiment of FIG. 12, after a predetermined amount of time (Δt) since the addition of a web page to a list of favorites, the mobile communication device 100 checks and determines whether the stored web page has been updated. If the stored web page is determined to have been updated, a thumbnail image 910 of the stored web page is automatically updated and the updated thumbnail image 920, instead of the old thumbnail image 910, will be displayed on the screen of the display unit 50 when the list of favorites is accessed by a user.

Alternatively, rather than automatically updating the thumbnail image when the stored web page has been updated, the mobile communication device 100 may prompt a user whether to update the thumbnail image 910 of the stored web page with an image from the updated web page (S330 in FIG. 4). The thumbnail image 910 will be updated to a new thumbnail image 920 only if the user wants to update the thumbnail image with a new image from the updated web page (S330 YES, S340, and S350 in FIG. 4). However, if the user does not want to update the thumbnail image 910 (S330 NO), basic operations will be performed without updating the existing thumbnail image 910 with the new image from the update web page (S360 in FIG. 4).

As described above, according to the present invention, an image of a web page stored in a list of favorites is displayed as a thumbnail image when the list of favorites is requested. Thus, a user may easily recognize web page information regarding the stored web page from the thumbnail images without a need to name the individual web pages to add them to the list of favorites.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

What is claimed is:

1. A method of displaying a list of favorites on a display screen of a mobile communication device, the method comprising:

accessing a website in response to a user command;

displaying a web page of the accessed website on the display screen;

receiving a first user input for registering the web page in the list of favorites;

registering the web page in the list of favorites in response to the first user input;

acquiring a thumbnail image from at least a portion of content of the displayed web page;

storing the acquired thumbnail image along with a uniform resource locator (URL) address of the web page corresponding to the thumbnail image in a memory of the mobile communication device;

displaying a plurality of thumbnail images each corresponding to one of a plurality of web pages registered in the list of favorites on the display screen when the list of favorites is retrieved in response to a first request;

receiving a second user input pointing to one of the plurality of thumbnail images displayed on the display screen;

in response to the second user input, displaying a pointer on the display screen and moving the displayed pointer on the display screen;

selecting one of the plurality of thumbnail images by locating the pointer on an area of a desired thumbnail image according to a movement of the pointer;

displaying an enlarged view of the selected one of the plurality of thumbnail images on the display screen while the pointer is located on the area of the desired thumbnail image, wherein the enlarged view of the selected thumbnail image is displayed overlaying the selected thumbnail image and at least part of other thumbnail images;

receiving a third user input for selecting one of the plurality of thumbnail images by recognizing sensory touching of the selected one of the plurality of thumbnail images;

accessing a web page corresponding to the selected one of the plurality of thumbnail images and displaying, on an entire area of the display screen, content of the accessed web page in response to the third user input; and automatically updating the selected one of the plurality of thumbnail images by acquiring and storing an image from the displayed content of the accessed web page, wherein the plurality of web pages registered in the list of favorites is displayed as one of a text format and a thumbnail image format according to a user setting.

2. The method of claim 1, wherein a size of the displayed content of the accessed web page is larger than a size of the selected one of the plurality of thumbnail images that has been enlarged.

3. The method of claim 1, further comprising:
receiving a fourth user input for selecting the one of the plurality of thumbnail images while the enlarged view of the one of the plurality of thumbnail images is displayed; and
displaying content of a web page that is associated with the selected one of the plurality of thumbnail images on the entire area of the display screen in response to the fourth user input.

4. The method of claim 3, wherein the content of the web page associated with the selected one of the plurality of thumbnail images is displayed on the entire area of the display screen without a toolbar.

5. The method of claim 1, wherein the plurality of thumbnail images are at least partially displayed as a background of the enlarged view of the one of the plurality of thumbnail images.

6. The method of claim 1, further comprising:
receiving a fourth user input pointing to a different thumbnail image from the plurality of thumbnail images overlaid by the enlarged view of the one of the plurality of thumbnail images; and
displaying a new enlarged thumbnail image corresponding to the different thumbnail image in response to the fourth user input.

7. The method of claim 5, wherein the enlarged view of the one of the plurality of thumbnail images is highlighted, and the plurality of thumbnail images at least partially displayed as the background are displayed in faded colors.

8. The method of claim 1, wherein the content of the accessed web page corresponding to the selected one of the plurality of thumbnail images is displayed with a name associated with the content on the display screen.

9. The method of claim 1, further comprising displaying information identifying the website or the content of the accessed web page, wherein the information identifying the website comprises at least a web address or a name of the website.

10. The method of claim 1, further comprising:
displaying a message notifying that the web page has been registered in the list of favorites for a predetermined time before displaying the plurality of thumbnail images on the display screen.

11. The method of claim 1, further comprising:
displaying the list of favorites in the text format according to a setting by a user.

12. The method of claim 1, further comprising:
displaying a plurality of thumbnail images including the updated one of the plurality of thumbnail images on the display screen when the list of favorites is retrieved in response to a second request.

13. The method of claim 1, wherein the selected thumbnail image is not visible when the enlarged view of the selected thumbnail image is displayed overlaying the selected thumbnail image.

14. A mobile communication device used in a wireless communication, the mobile communication device comprising:
an input unit configured to receive information related to a website;
a wireless communication unit for providing an interface for web access;
a display unit configured to display a web page obtained from the website and to receive a touch input;
a control unit configured to:
register the displayed web page in a list of favorites in response to a first user input for registering the web page in the list of favorites;
acquire a thumbnail image from at least a portion of content of the displayed web page when the displayed web page is registered in the list of favorites;
control the display unit to display a plurality of thumbnail images each corresponding to one of a plurality of web pages registered in the list of favorites when the list of favorites is retrieved in response to a first request;
a memory for storing the plurality of thumbnail images along with a uniform resource locator (URL) address of each of the plurality of web pages, each URL address corresponding to one of the plurality of thumbnail images,
wherein the controller is further configured to:
receive a second user input pointing to one of the plurality of thumbnail images displayed on the display unit;
in response to the second user input, control the display unit to display a pointer and to move the displayed pointer;
select one of the plurality of thumbnail images by locating the pointer on an area of a desired thumbnail image according to a movement of the pointer;
control the display unit to display an enlarged view of the selected one of the plurality of thumbnail images while the pointer is located on the area of the desired thumbnail image, wherein the enlarged view of the selected thumbnail image is displayed overlaying the selected thumbnail image and at least part of other thumbnail images;

recognize sensory touching of one of the plurality of thumbnail images in the list of favorites, the sensory touching generated by a third user input for selecting the one of the plurality of thumbnail images;

access, via the wireless communication unit, a web page corresponding to the selected one of the plurality of thumbnail images and control the display unit to display content of the accessed web page on an entire area of a display screen of the display unit in response to the third user input; and automatically update the selected one of the plurality of thumbnail images by acquiring and storing an image from displayed content of the accessed web page, wherein the plurality of web pages registered in the list of favorites is displayed as one of a text format and a thumbnail image format according to a user setting.

15. The mobile communication device of claim 14, wherein a size of the displayed content of the accessed web page is larger than a size of the enlarged view of the one of the plurality of thumbnail images.

16. The mobile communication device of claim 14, wherein the controller is further configured to control the display unit to display content of a web page that is associated with the one of the plurality of thumbnail images that has been enlarged, on the entire area of the display screen in response to a fourth user input for selecting the one of the plurality of thumbnail images that is received while the enlarged view of the one of the plurality of thumbnail images is displayed.

17. The mobile communication device of claim 16, wherein the content of the web page associated with the selected one of the plurality of thumbnail images is displayed on the entire area of the display screen without a toolbar.

18. The mobile communication device of claim 14, wherein the plurality of thumbnail images are at least partially displayed as a background of the enlarged view of the one of the plurality of thumbnail images.

19. The mobile communication device of claim 18, wherein the enlarged view of the one of the plurality of thumbnail images is highlighted, and the plurality of thumbnail images at least partially displayed as the background are displayed in faded colors.

20. The mobile communication device of claim 14, wherein the content of the accessed web page corresponding to the selected one of the plurality of thumbnail images is displayed with a name associated with the content on the display screen.

21. The mobile communication device of claim 14, wherein the display unit displays information identifying the website or the content of the accessed web page and the information identifying the website comprises at least a web address or a name of the website.

22. The mobile communication device of claim 14, wherein the controller is further configured to control the display unit to display a message notifying the registration of the web page in the list of favorites for a predetermined time before displaying the list of items on the display screen.

23. The mobile communication device of claim 14, wherein the controller is further configured to control the display unit to display the list of favorites in the text format according to a setting by a user.

24. A method of displaying a list of favorites on a display screen of a mobile communication device, the method comprising:

accessing a website in response to a user command;

displaying a web page of the accessed website on the display screen;

receiving a first user input for registering the displayed web page in the list of favorites;

registering the web page of the accessed website in the list of favorites in response to the first user input;

generating a thumbnail image based on at least a portion of content of the web page of the accessed website;

storing the generated thumbnail image;

displaying a list of a plurality of items each corresponding to a name of one of a plurality of web pages registered in the list of favorites on the display screen when the list of favorites is retrieved in response to a request;

receiving a second user input pointing to one of the plurality of items displayed on the display screen;

in response to the second user input, displaying a pointer on the display screen and moving the displayed pointer on the display screen;

selecting one of the plurality of menu items by locating the pointer on an area of a desired item according to a movement of the pointer;

retrieving a thumbnail image of a web page corresponding to the selected one of the plurality of items from a memory of the mobile communication device and displaying the retrieved thumbnail image on the display screen while the pointer is located on the area of the desired item;

receiving a third user input for selecting one of the plurality of items by recognizing sensory touching of the selected one of the plurality of thumbnail images;

accessing a web page corresponding to the selected one of the plurality of items and displaying content of the accessed web page on an entire area of the display screen in response to the third user input; and automatically updating a thumbnail image corresponding to the selected one of the plurality of items by acquiring and storing an image from the displayed content of the accessed web page, wherein the retrieved thumbnail image is displayed overlaying at least part of the list of items on the display screen, and wherein the plurality of web pages registered in the list of favorites is displayed as one of a text format and a thumbnail image format according to a user setting.

25. The method of claim 24, further comprising:

displaying the list of favorites in the thumbnail image format according to a setting by a user.

26. The method of claim 24, further comprising:

displaying a message notifying the registration of the web page in the list of favorites for a predetermined time before displaying the list of items on the display screen.

* * * * *